C. M. COONEY.
Bake Pan.
No. 80,147.
Patented July 21, 1868.
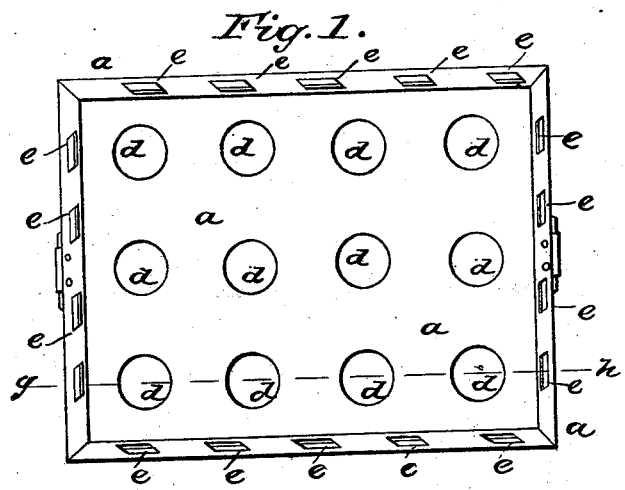
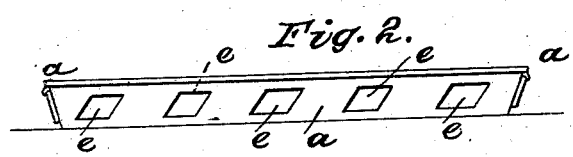
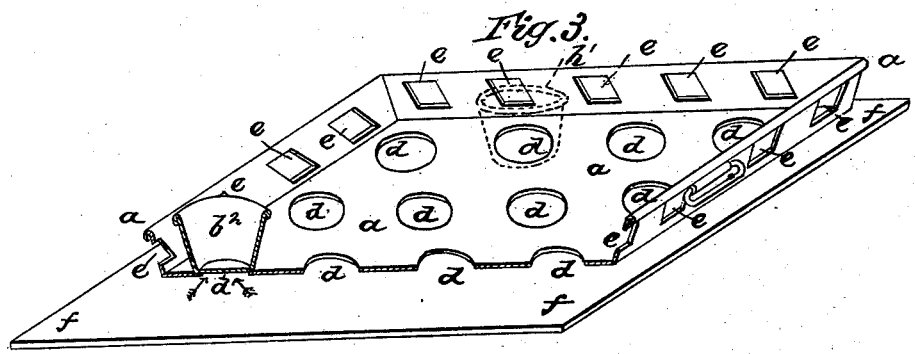
Witnesses:
Rowland Cox
Wm. L. Elliott
Inventor:
C. M. Cooney
by Harry Box
Attorney

United States Patent Office.

C. M. COONEY, OF WASHINGTON, DISTRICT OF COLUMBIA.

Letters Patent No. 80,147, dated July 21, 1868.

---

PERFORATED BAKE-PAN.

---

The Schedule referred to in these Letters Patent and making part of the same.

---

TO ALL WHOM IT MAY CONCERN:

Know ye that I, C. M. COONEY, of the city of Washington, in the county of Washington, and District of Columbia, have invented a Perforated Pan, being a new and useful improvement for preparing food and other substances requiring the action of heat in their preparation; and I do hereby declare that the following is a full and exact description, reference being had to the accompanying drawings, making part of this specification, and to the letters of reference marked thereon.

To enable others skilled in the art to make and use my invention, I proceed to describe its construction and operation.

My invention relates to providing a pan or other vessel, used for culinary or other purposes, wherein to accomplish the desired result. The agency of heat is necessary, with holes or open spaces in its lower portion or bottom, and with holes or open spaces in its upper portions or sides, or allowed to be open upon the sides, save at the corners, or at certain intervals uprights or standards may be erected upon the edge or circumference of the lower part or bottom of the pan or vessel, the ends of which are connected with each other by means of wire, so as to prevent a smaller vessel or substance, placed upon the upper surface of the bottom of the pan or vessel, from slipping off, by means of which perforated, or, as above described, pan, in combination with a smaller pan or vessel, so placed that its lowest surface covers one of the holes or open spaces in the bottom of the larger pan or vessel, food or other material requiring the action of heat in its preparation can be prepared with greater rapidity and less liability to burning than by ordinary known methods.

Figure 1, in the drawing hereto annexed and made a part of this specification, represents a front view of the bottom of the invention.

Figure 2, side view of the invention.

Figure 3, sectional view through line $g\ h$, fig. 1, showing interior of the invention, and illustrating operation.

I take any pan or vessel used for culinary or other purposes—an ordinary sheet-iron baking-pan being selected for this illustration—and perforate the bottom and sides thereof, as shown in figs. 1 and 2 respectively; over and covering one of which holes, in the lower part or bottom of the pan $a$, fig. 3, I place the smaller vessel, as shown by $b^1$, $d$ representing the open space or hole. The lower exterior surface of the vessel $b^2$ does not come in contact with the heated floor of the oven, $f$, and touches but a small portion of the upper surface of the bottom of the pan $a$, viz, that portion bordering upon the circumference of the hole $d$, whereby the liability of injuring or destroying the valuable qualities of the material contained in the vessel $b^2$, by burning the same, is greatly diminished. In the open space above the floor of the oven $f$, and below the lower exterior surface of the vessel $b^2$, and circumscribed by the circumference of the open space $a$, is an air-chamber, wherein the heat, by being confined, is condensed, and thus the portion of the vessel $b^1$, immediately above it, is more quickly affected by the heat than though it came in direct contact with the floor of the oven $f$. Hence the process of preparation is more rapid.

In the construction of my invention, a single piece of material may be employed, which may be cut or pressed into the required shape by means of dies or stamps. To form the uprights or standards hereinbefore mentioned, strips of the material of the desired size may be left unsevered from that portion of the material forming the bottom of the vessel or pan, and attached to the edge thereof, which, when turned at right angles to the upper interior surface of the bottom of the pan or vessel, answer the purpose aforesaid.

I do not claim a perforated steamer, as now known and used in combination with boilers for cooking purposes.

What I claim as my invention, and desire to secure by Letters Patent, is—

A pan or vessel, perforated in its lower part or bottom with holes, and open or perforated with holes in its upper parts or sides, in combination with a smaller pan or vessel, substantially as and for the uses and purposes herein described.

C. M. COONEY.

Witnesses:
R. W. WALKER,
EDM. F. BROWN.